(12) United States Patent
Pattison et al.

(10) Patent No.: US 10,907,802 B1
(45) Date of Patent: Feb. 2, 2021

(54) MOBILE 360° LIGHT SYSTEM AND METHOD OF CLEANING THE MOBILE 360° LIGHT SYSTEM

(71) Applicant: Valeo Vision SAS, Bobigny (FR)

(72) Inventors: Mark Pattison, Seymour, IN (US);
John Orisich, Seymour, IN (US);
Brant Potter, Seymour, IN (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 16/856,273

(22) Filed: Apr. 23, 2020

(51) Int. Cl.
| | |
|---|---|
| *F21V 15/01* | (2006.01) |
| *F21S 45/10* | (2018.01) |
| *F21S 41/141* | (2018.01) |
| *F21Y 115/10* | (2016.01) |
| *F21W 102/10* | (2018.01) |
| *F21W 107/10* | (2018.01) |
| *F21Y 107/30* | (2016.01) |
| *F21V 21/14* | (2006.01) |
| *F21V 17/00* | (2006.01) |
| *F21V 17/02* | (2006.01) |
| *F21V 21/22* | (2006.01) |

(52) U.S. Cl.
CPC .......... *F21V 15/012* (2013.01); *F21S 41/141* (2018.01); *F21S 45/10* (2018.01); *F21V 17/007* (2013.01); *F21V 17/02* (2013.01); *F21V 21/145* (2013.01); *F21V 21/22* (2013.01); *F21W 2102/10* (2018.01); *F21W 2107/10* (2018.01); *F21Y 2107/30* (2016.08); *F21Y 2115/10* (2016.08)

(58) Field of Classification Search
CPC ...... B60Q 1/0005; B60Q 1/0017; B60Q 1/18; B60Q 1/2657; B60Q 1/24; B60Q 1/2611; B60Q 1/2615; B60Q 1/2692; B60Q 1/2696; B60S 1/60; B60S 1/62; F21S 8/02; F21V 21/145; F21V 21/22; F21V 17/02; F21V 17/007; F21V 15/012; F21Y 2107/30
See application file for complete search history.

(56) References Cited

U.S. PATENT DOCUMENTS

| | | | |
|---|---|---|---|
| 3,683,842 A | 8/1972 | Logan | |
| 4,413,451 A | 11/1983 | Featherstone et al. | |
| 4,712,167 A | 12/1987 | Gordin et al. | |
| 5,068,770 A * | 11/1991 | Baziuk | B60S 1/603 362/509 |
| 5,155,667 A * | 10/1992 | Ho | B60Q 7/00 362/190 |
| 6,138,319 A * | 10/2000 | Benoit | B60Q 1/26 15/250.001 |
| 6,189,808 B1 * | 2/2001 | Daniels | B60S 1/0822 15/250.002 |
| 7,635,195 B2 * | 12/2009 | Tarter | F21L 4/00 362/162 |
| 9,764,680 B2 | 9/2017 | Tamay | |
| 2005/0270778 A1 | 12/2005 | Hicok et al. | |

(Continued)

*Primary Examiner* — Bryon T Gyllstrom
*Assistant Examiner* — James M Endo
(74) *Attorney, Agent, or Firm* — Young Basile Hanlon & MacFarlane, P.C.

(57) ABSTRACT

A light system a base that is configured to connect to a vehicle; a light layer that is movable into the base in a closed configuration and out of the base in an open configuration; and a cap located above the base and the light layer, the cap enclosing the light layer within the base when the light system is in the closed configuration.

20 Claims, 6 Drawing Sheets

(56) References Cited

U.S. PATENT DOCUMENTS

| | | | |
|---|---|---|---|
| 2006/0002122 A1* | 1/2006 | Griffin | B60Q 1/52 362/493 |
| 2008/0037265 A1* | 2/2008 | Hsu | F21V 15/01 362/388 |
| 2012/0314418 A1* | 12/2012 | Byrne | F21S 8/028 362/285 |
| 2013/0039081 A1* | 2/2013 | Czipri | B63B 45/04 362/477 |
| 2014/0085072 A1* | 3/2014 | Clifford | B60Q 1/2611 340/472 |
| 2016/0325715 A1* | 11/2016 | Niemczyk | B60S 1/48 |
| 2017/0346997 A1* | 11/2017 | Sato | H04N 5/2257 |
| 2018/0001837 A1* | 1/2018 | Trebouet | B08B 3/02 |
| 2018/0009418 A1* | 1/2018 | Newman | B60S 1/0818 |
| 2018/0072219 A1* | 3/2018 | Harris | F21S 45/10 |

* cited by examiner

MOBILE 360° LIGHT SYSTEM AND METHOD OF CLEANING THE MOBILE 360° LIGHT SYSTEM

FIELD

The present teachings relate to a light system that is movable between various vehicles and light system is capable of providing 360 degrees of light.

BACKGROUND

Lights of vehicles are typically static in position and once aimed maintain the aim. These lights are generally fixed within or on the vehicle. When these lights are used in industrial or commercial settings these lights may become dirty or blocked. Moreover, if a vehicle is being used during daylight the light system may become dirty so that when the light system is used at night the light system may be dirty from the daytime use. Additionally, if multiple pieces of equipment are used at nighttime a light system may need to be installed on each piece of equipment.

Examples of light systems may be disclosed in U.S. Pat. Nos. 3,683,842; 4,413,451; 4.712.167; and 9,764,680 and US Publication No. 2005/0270778 all of which are expressly incorporated herein by reference for all purposes. Thus, there is a need for a system that provides light 360° around a vehicle. It would be desirable to have a light system that is movable from vehicle to vehicle. There is a need for a system that can move between an open position and a closed position. It would be desirable to have a system that is self-cleaning.

SUMMARY

The present teachings provide: a light system comprising: (a) a base that is configured to connect to a vehicle; (b) a light layer that is movable into the base in a closed configuration and out of the base in an open configuration; and (c) a cap located above the base and the light layer, the cap enclosing the light layer within the base when the light system is in the closed configuration.

The present teachings provide: a light system comprising: (a) a base; (b) a light layer including a plurality of lights that project light substantially around a periphery of the light system; (c) a cleaning system located completely or partially within the base, the cleaning system being configured to clean the light layer; and (d) a cap located above the light layer.

The present teachings provide: a method comprising: spraying a fluid across a plurality of lights to clean the plurality of lights and moving the plurality of lights along a longitudinal axis between an open configuration where the plurality of lights provide light to surroundings and a closed configuration where the plurality of lights are protected from dirt, debris, ultra violet light, or a combination thereof.

The present teachings provide a system that provides light 360° around a vehicle. The present teachings provide a light system that is movable from vehicle to vehicle. The present teachings provide a system that can move between an open position and a closed position. The present teachings provide a system that is self-cleaning.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located with a vehicle. Preferably, the light system may be used with a car, motorcycle, bus, truck, semi-truck, SUV, XUV, four-wheeler, dirt bike, or a combination thereof. More preferably, the light system may be used with a commercial vehicle, an industrial vehicle, or an agricultural vehicle. The light system may be installed on farm equipment (e.g., a tractor, combine, grain cart, harvester); industrial equipment (e.g., front end loader, backhoe, excavator, dump truck); or other commercial equipment (e.g., tow truck) that operates at night. The light system may project in a forward direction, rear direction, side direction, or a combination thereof. Preferably, the light system projects a light 360 degrees around the vehicle. The light system may be integrated into a front end, a rear end, or both of a vehicle. Preferably, the light system is installed on an upper region of a vehicle (e.g., a roof). The light system may project light out away from the vehicle. The light system may be movably attached to the vehicle. The light system may be self-contained so that once a desired task is complete the light system may be removed and moved. The light system may be attached to the vehicle so that the vehicle is not damaged (e.g., non-destructive devices). The light system may include suction, anti-skid, straps, clamps, or a combination thereof. The light system may be installed using bolts, anchors, fasteners, or a combination thereof. The light system may include a platform and a periscope.

The periscope functions to provide light around a vehicle. The periscope functions to move between an open configuration and a closed configuration (e.g., cleaning configuration or a position where the light layer is protected). The periscope may be movable up and down relative to the platform. The periscope may elevate the light sources above the vehicle so that an area around the vehicle is lightened. The periscope may extend above the vehicle a distance of about 25 cm or more, about 50 cm or more, about 75 cm or more, or about 1 m or more (e.g., ±5 cm). The periscope may extend above the vehicle a distance of about 5 m or less, about 3 m or less, or about 2 m or less. The periscope may provide light 360 degrees around a vehicle. The periscope may provide light to a region substantially next to the vehicle and light to a region distal from the vehicle. For example, the periscope may provide light on ground that is about 20 feet away or less, about 15 feet away or less, or about 10 feet or less away from the vehicle (e.g., ±2 feet). The periscope may provide light on ground that is about 2 feet or more, about 5 feet or more, or about 7 feet or more away from the vehicle. The periscope may move along its own axis (e.g., up and down). The periscope may have one or more parts that nest within one another. The periscope may telescope to move up and down. The periscope may include a cap that creates a top and a base that creates a bottom.

The cap functions to create a lid on the top of the periscope. The cap function to enclose the light layer inside of the base when the periscope is in the closed configuration. The cap may prevent items from falling and damaging the light layer. The cap may assist in directing light from the light layer. The cap may include one or more reflective surface or be made of a reflective material. The cap may have a cross-sectional length (e.g., diameter) that is greater than the light layer, the sleeve, the base, or a combination thereof. The cap and the base may have substantially a same sized cross-sectional length (e.g., within 5 mm). The cap may be concave or have a concave connection with the light layer. The cap may extend downward towards the base. An outer periphery of the cap may contact the base when the periscope is in the closed configuration so that the insides (e.g., light layer) of the periscope is substantially enclosed and protected by the cap and the base. All or a portion of the cap may be complementary in shape to the base. When the cap is closed the cap and base may fit together to protect the contents between the cap and base, prevent dust and debris from entering, or both. The cap and base may be substantially sealed when in the closed configuration. The cap may have a peripheral edge that is complementary in shape to a peripheral edge of the base. For example, the base may have an edge that angled or chamfered and the cap may extend outward or downward with the same angle or chamfer. The cap may be located above, extend beyond, or both a light layer so that the light layer is protected by the cap.

The light layer may function to provide light to predetermined locations, to locations outside of the light system, around a vehicle, or a combination thereof. The light layer may project light in 360 degrees. The light layer may project light one or more distances, two or more distance, or three or more distances. The light layer may project light only one distance or only two distances. The light layer may provide one or more intensities, two or more intensities, or three or more intensities. The intensities and distances may be directly proportional. The light layer may be one large light source (e.g., similar to that of a light house). Preferably, the light layer is a plurality of light sources or light banks that provide light. The light layer may have portions that do not provide light. For example, the light layer may include connectors between the light banks or light sources that connect one light bank to an adjacent light bank. The light layer may be entirely transparent. The light layer may have regions or areas that may be opaque or may not transmit light. For example, connectors may be located between light banks and the connectors may not transmit light but the light banks may transmit light at such an angle that not dark spots may be present. The light layer may have a cross-sectional length that is smaller than a cross-sectional length of a sleeve so that all or a portion of the light layer may extend into the sleeve. The light layer may have one or more light banks. Preferably, the light layer includes a plurality of light banks and connectors.

The connectors function to connect two light banks together. The connectors function to create spacing between two adjacent light banks. The connectors may be substantially a same size as the light banks (e.g., an area of the connector may be substantially equal to an area as a light bank). A length of the connector and a length of the light bank may be substantially equal. The length of the connector may be sufficiently long so that two light banks may be located within the light layer without contacting one another. The connectors may be rounded so that a circle may be formed. The connectors may be flat and may extend from a second edge of a first light bank to a first edge of a second light bank. The connectors may create spacing so that a rear end of the adjacent light banks do not contact one another. The connector and two adjacent light banks may form a triangular shaped void. The connector may be made of metal, plastic, a polymer, or a combination thereof. The connector may be opaque. The connector may be translucent. The connector may be reflective. The connector may have a reflective coating or film. The connector may be sheet of material. The connector and the housing of the light banks may be one continuous piece of material. The connector may include one or more ports.

The one or more ports may function to permit fluid to pass through the light layer. The one or more ports may function to assist in cleaning the light layer. The one or more ports may include a spray nozzle. The one or more ports may permit fluid to be sprayed outward towards the light banks so that the light banks are cleaned during operation. The one or more ports may positively move fluid around the light layer so that dirt, dust, debris, or a combination thereof are prevented from settling upon the light layer or the lens of the light banks. For example, the ports may continuously blow air across the lenses of the light layer so that airborne dust and debris are maintained airborne and are prevented from settling on the light banks. The ports may permit air, water, or both to be provided to the light banks for cleaning.

The light banks function to provide light to one or more locations of interest. The light banks may provide light so that dark spots are not created around a vehicle. The light banks may selectively turn off one or more lights during operation (e.g., near lights, far lights, intermediate lights, or a combination thereof). The light banks may be radially spaced apart around an outer periphery of the light layer. Each light bank may include one or more rows of lights. Each light bank may include one or more rows of lights located above one or more adjacent rows of lights. For example, a light bank may include a row of lights located above another row of lights. The rows of lights may include one or more, two or more, three or more, or four or more light sources. Each row of lights may include 10 or less, 8 or less, or 6 or less light sources. The light banks may each include one or more regions, light sources, or both. The light banks may include one or more regions or one or more group of lights that provide light to one or more regions. The light bank may include at least a near region and a far region (and may also include an intermediate region).

The near region includes one or more light sources that function to illuminate objects at a distance of about 9 m or less, about 8 m or less, or about 7 m or less from a vehicle. The near region may illuminate objects a distance of about 1 m or more, about 2 m or more, or about 3 m or more from a vehicle. The intensity of light from light sources in the near region may be less than an intensity of light from the light sources in the far region or an intermediate region. The intensity of light from the light sources in the near region may be about 5,000 lumens or more, about 7,500 lumens or more, or about 9,000 lumens or more when measured at a distance where the near region and an intermediate region or a far region intersect (e.g., 9 m from a vehicle). The intensity of light from the light sources in the near region may be about 15,000 lumens or less or about 10,000 lumens or less when measured at a distance where the near region and the intermediate region or the far region intersect. The near region may illuminate areas directly around the vehicle. The near region may remain on at all times of operation of the light system. The near region may include one or more light sources in each light bank. The near region may include two or more, three or more, four or more, six or more, ten or more, or twenty or less light sources in each light bank. The near region may be partially overlapped by one or more intermediate region light sources.

The intermediate region includes one or more light sources that function to illuminate objects at a distance of about 25 m or less, about 23 m or less, or about 21 m or less from a vehicle. The near region may illuminate objects a distance of about 7 m or more, about 9 m or more, or about 11 m or more from a vehicle. The intermediate region may project light that overlaps with the near light, the far light, or both. The intensity of light from light sources in the intermediate region may be less than an intensity of light from the light sources in the far region but greater than that of the near region. The light system may be free of an intermediate region or intermediate lights. The intensity of light from the light sources in the intermediate region may be about 15,000 lumens or more, about 20,000 lumens or more, or about 25,000 lumens or more when measured at distance where the intermediate region and far region intersect (e.g., 20 m from a vehicle). The intensity of light from the light sources in the intermediate region may be about 30,000 lumens or less or about 32,000 lumens or less when measured at a distance where the intermediate region and the far region intersect. The intermediate region may illuminate areas directly around the vehicle. The intermediate region may remain on at all times of operation of the light system. The intermediate region may have light sources that may be selectively turned off. The intermediate region may include one or more light sources in each light bank. The intermediate region may include two or more, three or more, four or more, or six or less light sources in each light bank. The light sources of the intermediate region may be located above the near region light sources and below the far region light sources.

The far region includes one or more light sources that function to illuminate objects at a distance of about 50 m or less, about 45 m or less, or about 40 m or less from a vehicle. The far region may illuminate objects a distance of about 10 m or more, about 15 m or more, or about 20 m or more from a vehicle. The intensity of light from light sources in the far region may be less than an intensity of light from the light sources in the near region, the intermediate region, or both. The intensity of light from the light sources in the far region may be about 25,000 lumens or more, about 30,000 lumens or more, about 35,000 lumens or more, or about 40,000 lumens or more (e.g., about 42,000 lumens) when measured at distance where the intensity of the far light plateaus (e.g., 40 m from a vehicle). The intensity of light from the light sources in the far region may be about 50,000 lumens or less or about 45,000 lumens or less when measured at a distance where the light intensity plateaus. The far region may illuminate areas farthest around the vehicle relative to the other regions. The far region may be selectively turned off when other vehicles or people are detected. The far region may include one or more light sources in each light bank. The far region may include two or more, three or more, four or more, or six or less light sources in each light bank.

The light source functions to produce light. The light source may be a device or plurality of devices that create light and the light extends outward from the light source. The light source may produce a high beam, a low beam, or both. The light source may be aimed for near field, intermediate field, or far field. The light source may be any type of lighting device that produces light such as an incandescent bulb, fluorescent light, compact fluorescent lamp, halogen lamp, light emitting diode (LED), laser diode, high intensity discharge lamps (HID); halogen lights, xenon lights, any other light source, or a combination thereof. The light source may be a single lamp or bulb. Preferably, the light source includes a plurality of lamps, bulbs, diodes, or a combination thereof. The light source may be one LED and a reflector or one LED and a collimator. The light source may be an array. The light source may include two or more, 5 or more, 10 or more, 20 or more, or even 50 or more devices that produce light and combine together to form the light source. The light source may include 500,000 or less, 300,000 or less, 200,000 or less, 100,000 or less, or 50,000 or less devices that produce light. For example, if the light source is a 10×10 array of light devices some of the 100 devices may be selectively turned on and off, dimmed, brightened, or a combination thereof to create patterns, images, words, text, numbers, shapes, dark spots, bright spots, or a combination thereof. The light source may be static. The light source may be free of movement relative to the light layer. The light source may be fixed within the light bank or the light layer. The light source may be fixed and the light from the light source may be moved, bent, directed, or a combination thereof by optical elements. The light from the light source may be moved or aimed from near field to far field or vice versa. Near field may include a projection onto the ground or a road surface. A driver may control movement between near field, intermediate field, and far field. The light system may automatically adjust between far field, intermediate field, and near field. Each device of the light source may be turned on an off. The color, intensity, shape, or a combination thereof of each device of the light source may be controlled or adjusted. For example, some devices may be turned red and other devices may remain white. The light source may direct light to a driving surface or ground around a vehicle. For example, a center of the light may be located on the driving surface or ground around a vehicle. The light source may direct light above a driving surface (e.g., some light may contact and illuminate the driving surface but a center of the light may be located above the driving surface). The light source may be directed substantially parallel to the driving surface or ground. For example, a center of the light, an axis of the light, or both may extend parallel to the driving surface. The light source may extend along an axis or may be directed away from the axis. The light sources may be connected to a sensor and a controller that control operation of the light sources, the periscope, or both.

The sensor functions to sense other vehicles, oncoming lights, people, objects, ground effects, items on a surface, or a combination thereof. The sensor may selectively turn on or off some of the light sources when objects are sensed. The sensor may detect lights, movement, people, vehicles, or a combination thereof. The sensor may detect a predetermined darkness level and automatically turn the light system on. The sensor may detect a predetermined lightness level and automatically turn the lights off. The sensor may be remote from the light system. The sensor may communicate with the light system via a wire. The sensor may communicate with the light system wireless. The sensor and light system may be connected with near field communications, WIFI, Bluetooth, or a combination thereof. The sensor may be located on or within a cap of the periscope. The sensor may communicate with the controller and the controller may control the light system.

The controller functions to turn on, turn off, clean, raise, lower, selective turn on or off light sources, or a combination thereof the light system. The controller may be located within the light system. A portion of the controller may be located within the light system and a portion of the controller may be located remote from the light system. The controller may operate automatically based on predetermined conditions, based upon conditions sensed from the sensor, information from a user, or a combination thereof. For example, the user may have a remote that may control the light system. The controller may determine when the light system should turn off or on based upon information from the sensor. The controller may determine when the brightness or intensity of the lights have diminished and clean the lights or the light layer. The controller may control movement of the periscope up and down. The controller may control movement of the periscope so that the cap, light layer, and sleeve are moved.

The sleeves may function to raise the light layer out of the base. The sleeves may be telescoping to raise the light layer. The light system may include one or more sleeves, two or more sleeves, three or more sleeves, four or more sleeves, eight or less sleeves, or ten or less sleeves. The sleeves may nest within one another, the base, or both. The sleeves my determine a height the light layer is raised above the vehicle. Each of the sleeves may have a height substantially equal to a height of the base so that when the light system is in the closed configuration the sleeves and light layer are located between and covered by the cap and base. The sleeves may slide axially to raise and lower the light layer and the cap. The sleeves may be locked in a raised position (e.g., open configuration) the lowered position (e.g., closed configuration), or both. The sleeves may lift the light layer out of the base.

The base functions to house all of the components of the periscope, support the periscope, or both. The base functions to protect the components when the light system is in a stored configuration. The base may include all of the controls, electronics, controllers, sensors, motors, or a combination thereof. The base may include all or a portion of a cleaning system. The base may enclose all of the components so that the light system is transportable. The base may protect the components (e.g., light layer, sleeves) from damage, dust, debris, or a combination thereof. The base may be connected to a platform or directly connected to a vehicle. The base may be solid or may include one or more cavities.

The cavities may function to store electrical elements, all or portion of a cleaning system, a lifting device, fluid, motors, pump, or a combination thereof. The cavities function to create a space radially outward of the sleeves or between the sleeves and an inside of an outer surface of the base. A fluid may circulate or be recirculated within the cavities. For example, a fluid may be passed over the light layer and collected within the cavities and then cleaned so that the fluid may be reused. The cavities may be a single cavity that forms a ring around the sleeve. The cavities may be a plurality of compartments that include different components of the light system. For example, a motor or lifting device may be located within one cavity and a fluid may be located within a different cavity. The cavity may receive a rear side of the locks.

The locks function to connect the cap to the base when the light system is in the closed configuration, move nozzles into a stored position, or both. The locks may prevent the periscope from opening during transportation. The locks may prevent the light layer from being damaged when the light system is not in use. When the locks are in use the light system may be substantially sealed from fluid, debris, dust, or a combination thereof. The locks may automatically bias closed when the cap contacts the locks. The locks may release the cap when the controller actuates the locks. The locks all may lock and release simultaneously. The locks may be connected in parallel so that when one lock is actuated all of the locks are actuated. The locks may be controlled by a cord, wire, string, actuator, or a combination thereof. The locks may be actuated or released by the lifting device or when the lifting device is actuated.

The lifting device functions to move the light layer axially away from the vehicle. The lifting device function to elevate the light layer so the light can be provided unobstructed from the light system. The lifting device may telescope the sleeves and the light layer. The lifting device may operate pneumatically, hydrologically, mechanically, or a combination thereof. The lifting device may have a cylinder that when pumped with a fluid pushes against the cap and base and lifts the light layer. The lifting device may be a stepper motor. The lifting device may be one or more gears that lift the sleeve and light layer. The lifting device may be located on a side of the sleeve, near the base, in a center of the base, create a force between the cap and the base that lifts, or a combination thereof. The lifting device may move the periscope between the open configuration and the closed configuration.

In the open configuration the light layer functions to provide light around a vehicle. In the open configuration the light layer may be raised above the vehicle. In the open configuration the light layer and sleeves may be telescoped. In the open configuration the light layer may be cleaned. In the open configuration the light layer may be exposed to the elements. The periscope may be moved from an open configuration to a closed configuration to protect the light layer when not in use.

In the closed configuration the cap and base may be located proximate to one another, surround the light layer and sleeve, or both. In the closed configuration the sleeves and light layer may be nested within the base. In the closed configuration the cap may be locked to the base. In the closed configuration the light layer may be cleaned. In the closed configuration, the light layer may be protected against UV light. The light system may be transported, installed, or both when the light system is in the closed configuration. The light system may be moved via a platform when the light system is in a closed configuration.

The platform may function as a support surface for the light system or the periscope. The platform may be connected to a vehicle and then the periscope connected to the platform. The platform may be permanently connected and the periscope moved from platform to platform. The platform may support the periscope during movement. The platform may include electrical connections, fluid connections, sensor connections or a combination thereof. The platform may be electrically connected to the vehicle so that when the periscope is added to the platform the periscope may be quickly and easily be connected to the vehicle's electrical system. The platform may include power, fluid, motors, or a combination thereof. The platform may only be a rigid material that connects to the vehicle. The platform may be a flat surface. The platform may assist in leveling the periscope. The platform may connect to structural components (e.g., an a-pillar, b-pillar) of the vehicle to create a layer above a roof of the vehicle. The platform may create a roof above the roof so that there is no contact with actual roof. The platform may be an elevated rack that supports the periscope. The platform may support the periscope and external parts of a cleaning system.

The cleaning system functions to remove dirt, debris, or any other contaminants from the light layer so that light from the light layer lights regions surrounding the vehicle. The cleaning system may run continuously. The cleaning system may run intermittently. The cleaning system may use air. The cleaning system may use water. The cleaning system may mechanically clean. The cleaning system may include one or more sensors that sense an intensity of light exiting the light layer. The cleaning system may be free of fluid usage. The cleaning system may only operate when the periscope is in the closed configuration. The cleaning system may only use water when the periscope is in the closed configuration. The cleaning system may only clean when the periscope is in the open configuration. The cleaning system may include one or more nozzles.

The nozzles function to remove material that inhibits light from extending out from the light layer. The nozzles may function to prevent materials from collecting on the light layer. The nozzles may distribute a fluid. The nozzles may direct a fluid across each of the lenses (e.g., outer layer) of each light bank. The nozzles may blow air across or around the light banks to create turbulence for airborne particles. The nozzles may blow air, a fluid, water, or a combination thereof at a pressure of 300 kPa or more, 500 kPa or more or even about 750 kPa or more. The nozzles may blow air, a fluid, water, or a combination thereof at a pressure of about 2000 kPa or less, about 1500 kPa or less, or about 1000 kPa or less. The nozzles may blow a fluid substantially 360 degrees around the nozzles. The nozzles may be located in the base. The nozzles may be part of a lock. The nozzles and locks may be alternatively located around the base, the light system, or both. The nozzles may be part of the lock so that when the periscope moves into a closed configuration that nozzles are stored and protected. The nozzles may only blow a fluid to the sides to direct the fluid across the faces of the light banks. The nozzles may create turbulence in the fluid when the fluid is moved. The nozzles may direct water, air, a liquid with chemicals, or a combination thereof.

The fluid functions to clean the light sources, the lenses, or both. The fluid functions to prevent dirt and debris from collecting on the light sources, lenses, or both. The fluid may be water. The fluid may be water with a chemical (e.g., a surfactant). The fluid may be a foam. The fluid may be air. The fluid may be stored, pressurized, recycled, or a combination thereof. The fluid may be stored in or distributed by a fluid distributor, a fluid reservoir, or both The fluid distributor, fluid reservoir, or both (hereinafter fluid distributor) functions to store fluid, store compressed fluid, clean the fluid, or a combination thereof. The fluid distributor may hold a volume of fluid. The fluid distributor may hold a predetermined amount of fluid. The fluid distributor may hold a sufficient amount of fluid so that the fluid distributor only has to be refilled once a day or once a shift. The fluid distributor may include a pump or compressor. The fluid distributor may be a tank including a plurality of holes. The fluid distributor may distribute fluid to one or more fluid lines. Preferably, the fluid distributor distributes fluid to a plurality of fluid lines.

The fluid lines may provide fluid across the lenses, the light banks, or both. The fluid lines may circulate the fluid intermittently or continuously. The fluid lines may provide the fluid to the ports, a nozzle, or both. The fluid lines may expand and contract. The fluid lines may be movable with the light layer, the sleeves, or both. The fluid lines may be made of rubber. The fluid lines may be made of braded metal or plastic. The fluid lines may hold a fluid with the pressure taught herein. The fluid lines may extend 360 degrees around the periscope. The fluid lines may extend on one or more layers or regions of the periscope. The fluid lines may in addition to a mechanical cleaning device.

The mechanical cleaning device functions to remove dirt, debris, items that inhibit light from illuminating region around a vehicle, or a combination thereof. The mechanical cleaning device may be passive. For example, the mechanical cleaning device may sit in one location and the light layer may move up and down or rotate to remove the dirt, debris, items that inhibit light, or a combination thereof. The mechanical cleaning device may move up and down, rotate, or both. The mechanical cleaning device may be used in addition to fluid. The mechanical cleaning device may include a brush or bristles. The brush may be a sponge a paper with grit. The mechanical cleaning device may agitate the light layer while a fluid is being applied. The mechanical cleaning device may move over the light layer to loosen the dirt and debris. The mechanical cleaning device may work intermittently upon a sensed cleanliness or lack of cleanliness. The mechanical cleaning device may be sufficiently rigid to loosen or remove dirt and debris. The mechanical cleaning device may be sufficiently soft that the lenses, light bank, or both are not scratched or damaged. The mechanical cleaning device may move up and down the light layer, rotate around the light layer, or both.

The light system, mechanical cleaning device, or both may be operated by a method. The method may include moving the light system along a longitudinal axis. Spraying a fluid on the light source. Mechanically cleaning the light source. Refilling a cavity with a fluid. Spraying water on the light layer. Running water across the light layer. Cleaning the light layer in a closed configuration, an open configuration, or both. Blowing air across the light layer. Cycling the light layer between an open configuration and a closed configuration. Rotating the light layer about a rotational axis. The cleaning system may run continuously, intermittently, upon a sensed condition, upon an amount of sensed light being reduced (relative to a clean light), or a combination thereof. The cap may be located to the base. The cap, light layer, or both may be raised a distance of one or more sleeves, two or more selves, or three or more sleeves. A brush may be raised across the light layer to mechanically clean. The brush may remove water, debris, or both. The brush may act as a squeegee.

Figure 1:
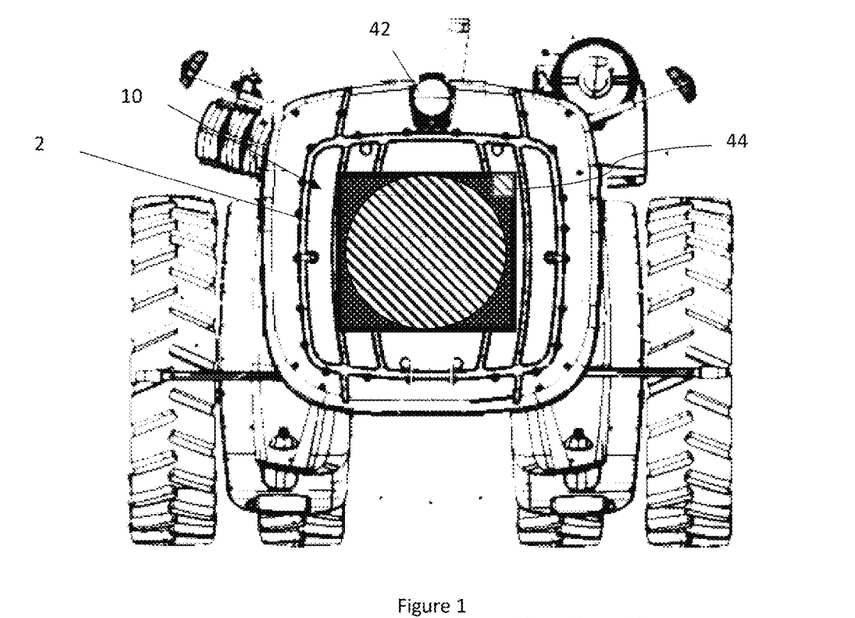
FIG. 1 is a top view of a vehicle including the light system.

FIG. 1 illustrates a top view of a vehicle 2 including a light system 10. The light system 10 includes a plurality of light sources and a sensor 42 so that as the sensor 42 senses oncoming light some of the light sources are turned on and off. The sensor 42 is in communication with a controller 44 that controls the light sources and movement of the light system.

Figure 2:
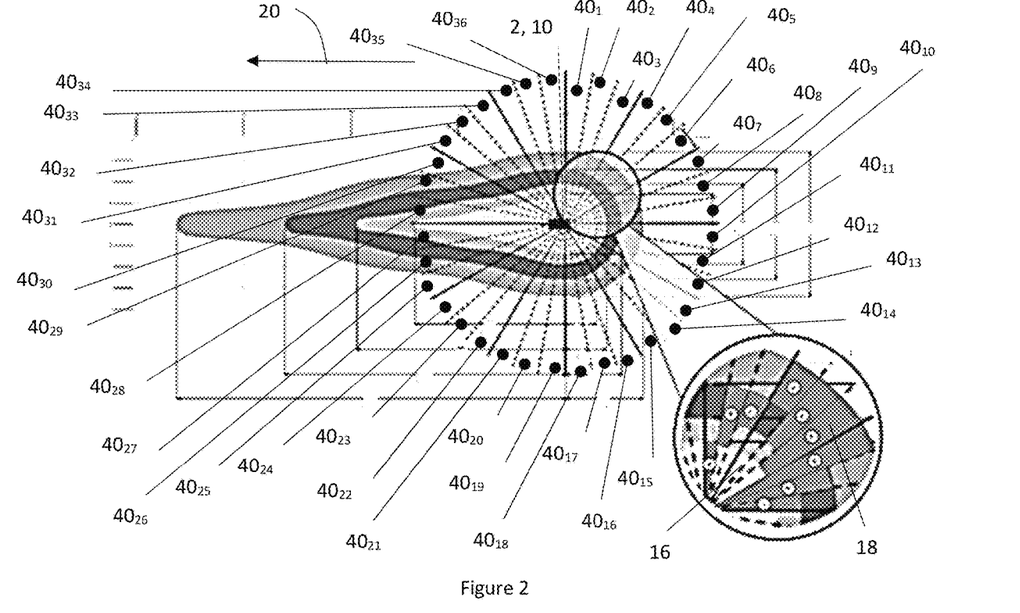
FIG. 2 is a top view of light segments created by the light system with a close up on different regions within each segment.

FIG. 2 is a top view of light segments 40 formed by the light system 10 around a vehicle 2. The light system 10 is divided into a plurality of segments 40. As shown, the light system 10 is broken into 36 segments that are labeled $40_1$ as the first light segment and $40_{36}$ being the last light segment with light segments $40_2$-$40_{35}$ being located therebetween. FIG. 2 also has a close-up view of some of the segments 40 and a near region 16 and far region 18 within the segments.

Figure 3:
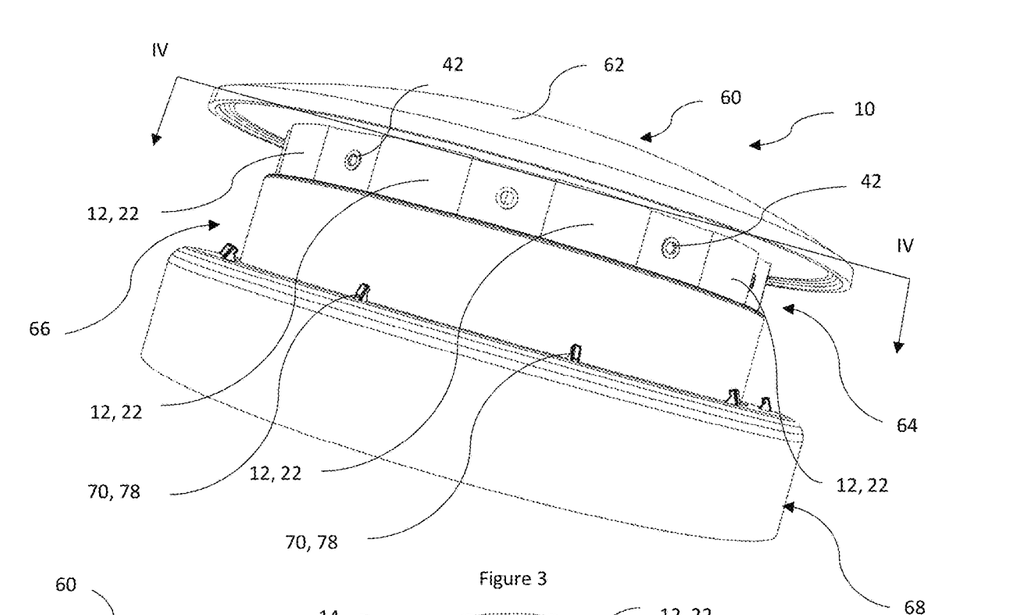
FIG. 3 is a perspective view of a light system.

FIG. 3 is a perspective view of a light system 2. The light system 2 is a periscope 60. The periscope 60 includes a cap 62, a light layer 64, a sleeve 66, and a base 68. The light layer 64 includes sensors 42 that sense surroundings such as other vehicles, lights, or people. The light layer 64 includes a plurality of light sources 12 in a light bank 22. The base 70 includes a plurality of locks 70 around the periscope 60 for locking the cap 62 in a closed position. The plurality of locks 70 may also include nozzles that spray a fluid on or towards the light bank 22 to clean the light system 10.

Figure 4:
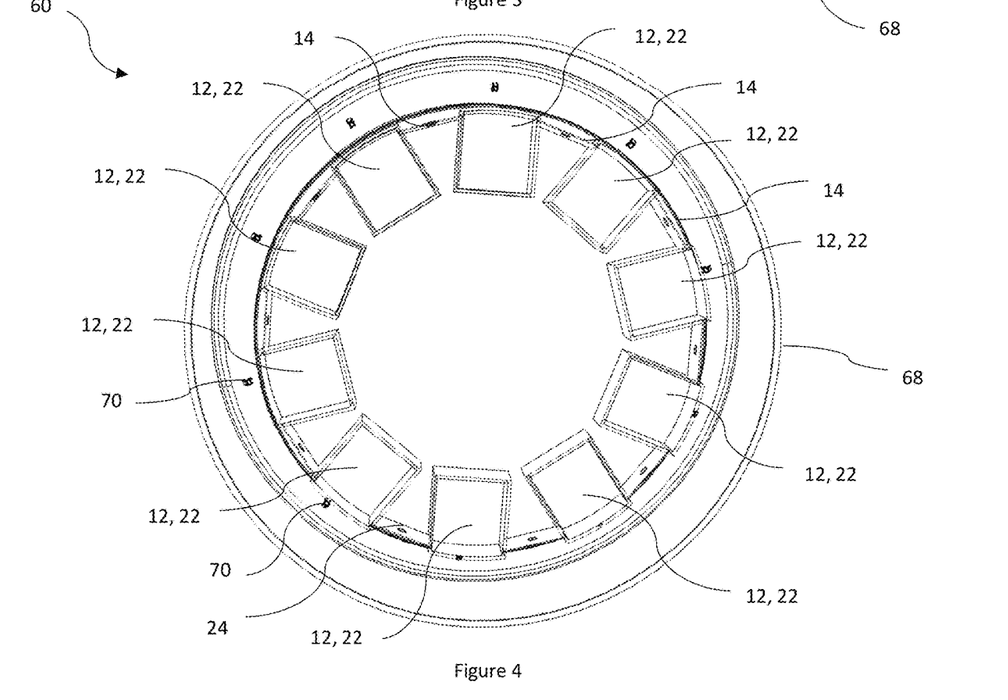
FIG. 4 is a cross-sectional view of the light system of FIG. 3 along lines IV-IV.

FIG. 4 is a cross-sectional view of a base 68 of a periscope 60. The base 68 includes a plurality of light banks 22 spaced apart by a plurality of connectors 14. Each of the light banks 22 include a plurality of light sources 12 that direct light 360 around a vehicle (not shown). The connectors 14 include ports 24 that allow for fluid to pass around an outside of the light banks 22.

Figure 5:
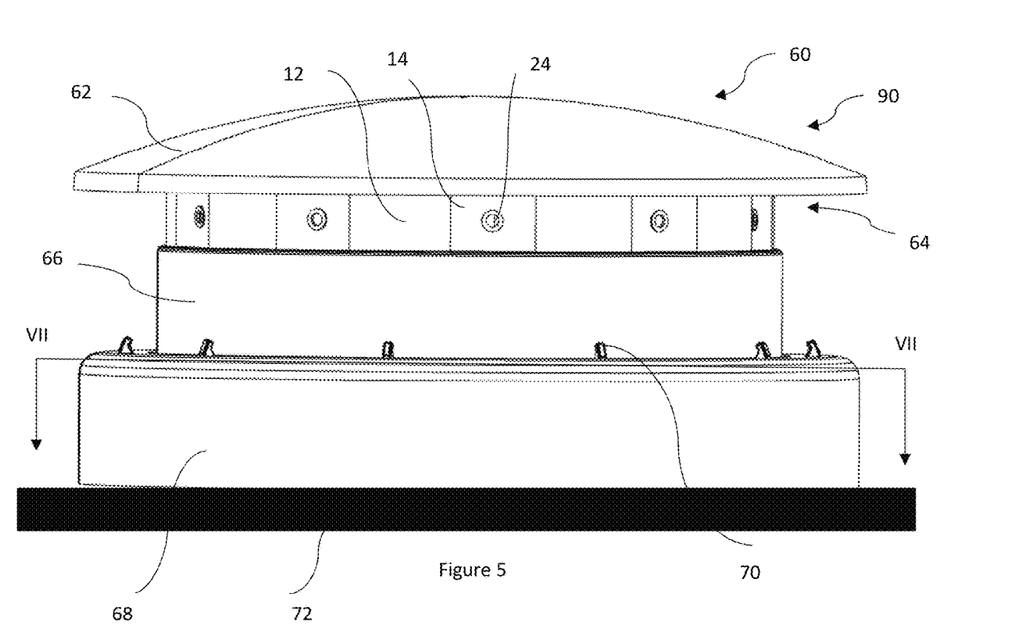
FIG. 5 is a front view of a light system in an open configuration.

FIG. 5 is a plan view of the periscope 60 in an open configuration 90. As shown, a cap 60 extends above a light layer 64 that has light sources 12 with connectors 14 located between the light sources 12. The connectors 14 include ports 24 that extend therethrough. A sleeve 66 is located below the light layer 64 so that when the periscope 60 moves from the open configuration to the closed configuration, the light layer 64 slides into the sleeve 66 and the base 68. The base 68 includes a plurality of locks 70 that connect to the cap 62. The periscope 60 is located on a platform 72 that assists in moving the periscope 60 or connecting the periscope 60 to a vehicle (not shown).

Figure 6:
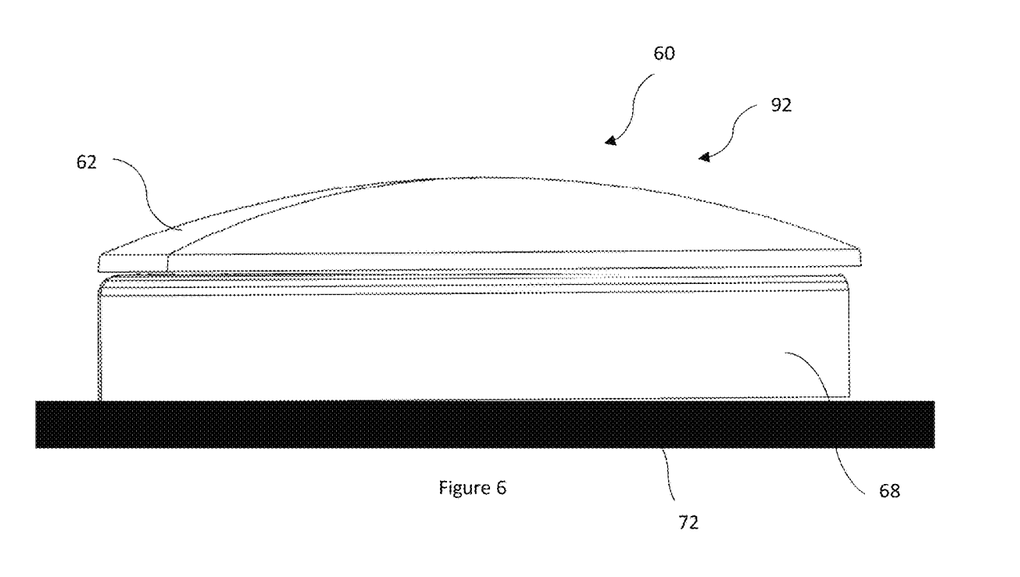
FIG. 6 is a front view of a light system in a closed configuration or a cleaning configuration.

FIG. 6 is a plan view of the periscope 60 in the closed configuration or cleaning configuration 92. In the closed configuration or cleaning configuration 92 the cap 62 is lowered onto the base 68. The light layer (not shown) is nested into the sleeve (not shown) and the sleeve is nested into the base 68. The cap 62 can be located onto the base 68 by the locks (not shown). As shown, the periscope 60 sits upon a platform 72.

Figure 7:
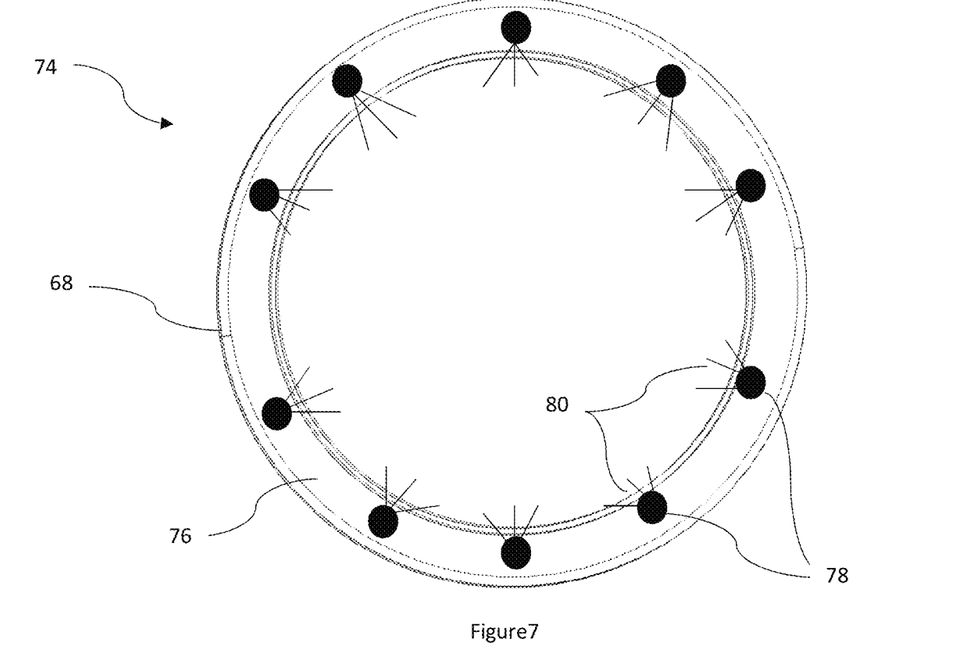
FIG. 7 shows a cleaning system.

FIG. 7 is a top view of a cleaning system 74 located within a cavity 76 within the base 68. The cavity 76 holds all or a portion of a plurality of nozzles 78 that align with the lights (not shown) when the lights are in the closed configuration or the cleaning configuration (not shown) or the open configuration. Each of the nozzles 78 are aligned with a light so that fluid 80 is directed towards each light to clean the light. The nozzles 78 may be actuated to extend above the base 68 when in the cleaning configuration or be located at an internal location (e.g., inside the cavity 78) to clean.

Figure 8:
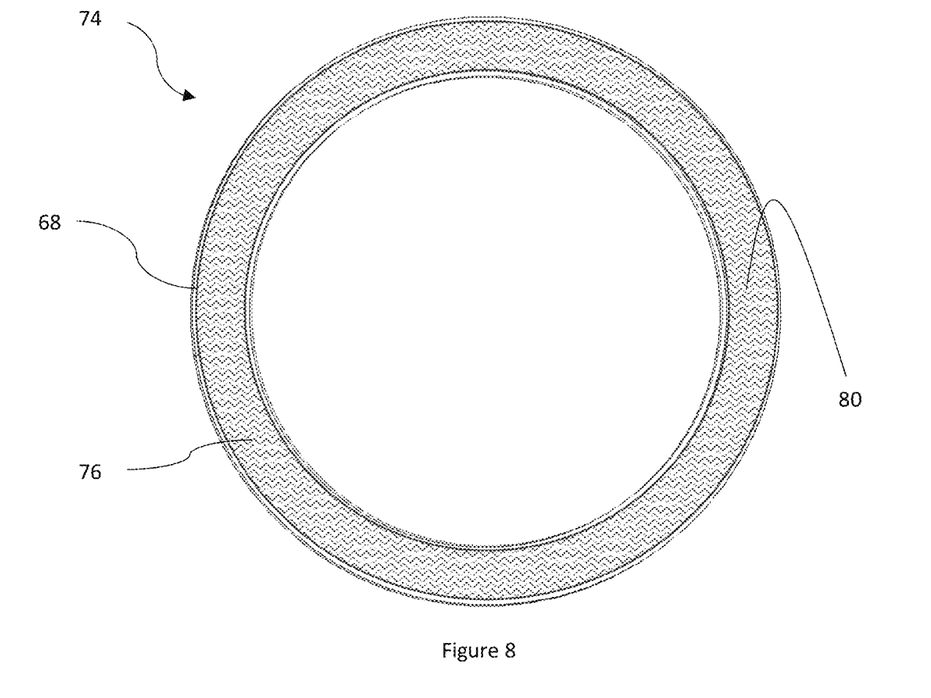
FIG. 8 shows a cleaning system.

FIG. 8 is a top view of a cleaning system 74 located within a cavity 76 of the base 68. The cavity 76 is filled with fluid 80 that is stored within the cavity 76 so that the fluid can clean the light sources (not shown).

Figure 9:
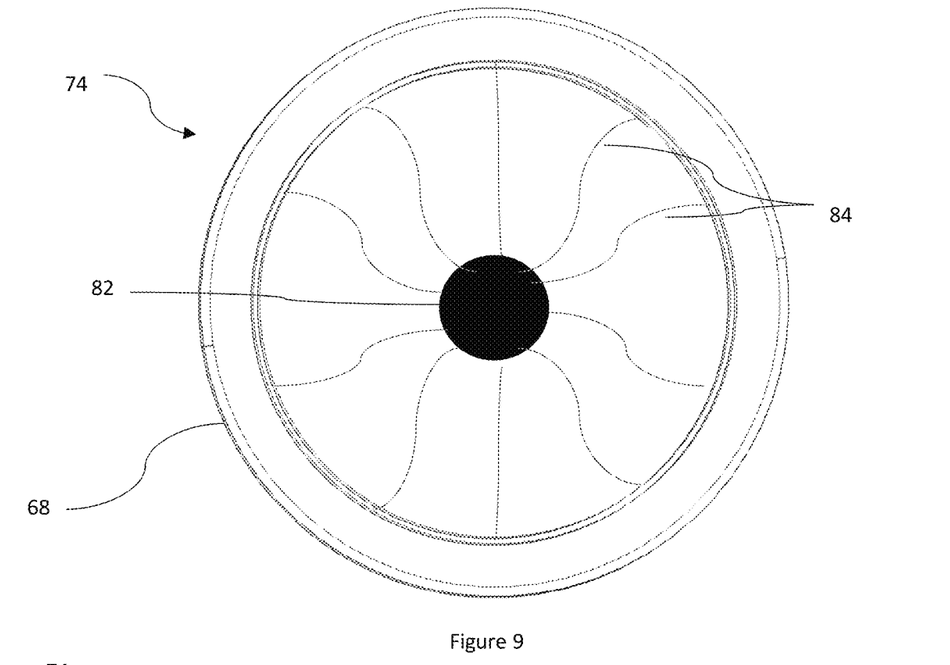
FIG. 9 shows a cleaning system.

FIG. 9 is a top view of a cleaning system 74. The cleaning system 74 includes a fluid distributor 82 that may also be a fluid reservoir to store fluid. A plurality of fluid lines 84 extend between the fluid distributor 82 and the base 68 or the ports in the light layer (not shown) so that fluid is distributed to clean the light sources (not shown) within the light system.

Figure 10:
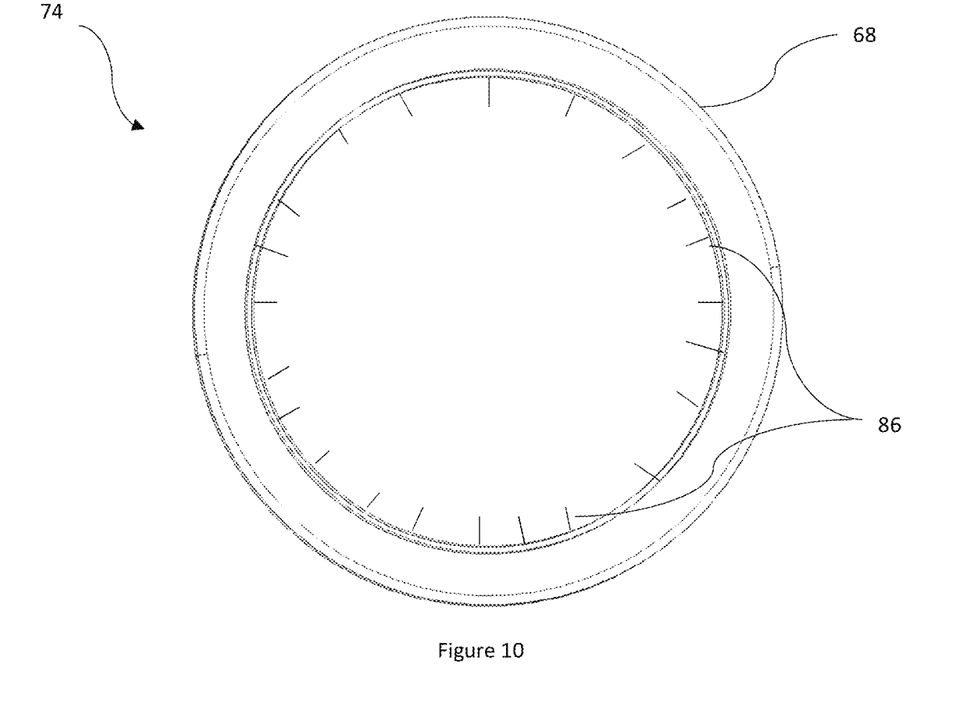
FIG. 10 shows a cleaning system.

FIG. 10 is a top view of a cleaning system 74. The cleaning system 74 includes a plurality of brushes 86 extending around an inside of the base 68.

Figure 11:
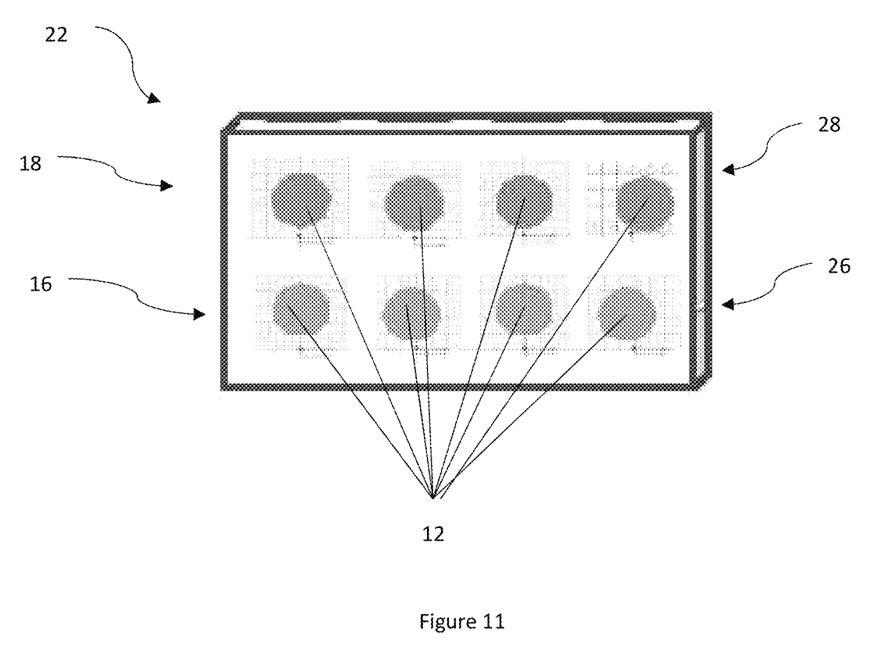
FIG. 11 is a front view of a light bank.

FIG. 11 is a light bank 22 having a plurality of light sources 12. The light sources 12 are divided into a near region 16 having a plurality of near lights 26 that project light a first distance and a far region 18 having a plurality of far lights 28 that project light a second distance that is greater than the first distance.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
10 Light System
12 Light Source
14 Connector
16 Near Region
18 Far region
20 Direction of Movement
22 Light Bank
24 Port
26 Near Light Bank
28 Far Light Bank
40 X-X+1 Segment
42 Sensor
60 Periscope
62 Cap
64 Light Layer
66 Sleeve
68 Base
70 Locks
72 Platform
74 Cleaning System
76 Cavity
78 Nozzle
80 Fluid
82 Fluid Distributor/Fluid Reservoir
84 Fluid Line
86 Brush
90 Open Configuration
92 Closed Configuration/Cleaning Configuration

We claim:

1. A light system comprising:
a. a base that is configured to connect to a vehicle;
b. a light layer that is movable into the base in a closed configuration and out of the base in an open configuration, wherein the light layer includes a plurality of light banks and a plurality of connectors spaced apart along the light layer;
c. a cap located above the base and the light layer, the cap enclosing the light layer within the base when the light system is in the closed configuration; and
a cleaning system including a fluid that cleans the light layer; and
wherein some or all of the plurality of connectors include ports and the fluid extends through the ports to clean the plurality of light banks within the light layer.

2. The light system of claim 1, wherein the light system includes an axis and the light layer moves axially along the axis when moving between the open configuration and the closed configuration.

3. The light system of claim 1, wherein the light system is generally circular or the light layer includes a generally circular periphery.

4. The light system of claim 1, wherein a sleeve is located between the base and the light layer.

5. The light system of claim 4, wherein in the closed configuration the light layer is fully or partially nested within the sleeve and the sleeve is fully or partially nested within the base.

6. The light system of claim 1, wherein a plurality of locks connect the cap and the base so that during movement of the light system from one location to another location the cap is prevent from axially moving away from the base.

7. The light system of claim 1, wherein the plurality of light banks are located around a periphery of the light layer.

8. The light system of claim 7, wherein the plurality of light banks each include one or more near lights and one or more far lights.

9. The light system of claim 7, wherein the plurality of light banks are separated by one or more of the plurality of connectors.

10. The light system of claim 1, wherein the cleaning system includes a plurality of nozzles and the plurality of nozzles direct a fluid across the light layer.

11. The light system of claim 10, wherein the cap covers the plurality of nozzles when the light system is in a closed configuration.

12. The light system of claim 1, wherein the light layer provides light 360° around the light system.

13. A light system comprising:
a. a base;
b. a light layer including a plurality of lights that project light substantially around a periphery of the light system;
c. a cleaning system located completely or partially within the base, the cleaning system being configured to clean the light layer; and
d. a cap located above the light layer
wherein the light system is movable between an open configuration and a closed configuration;
wherein the cleaning system cleans the light layer as the light layer moves between the open configuration and the closed configuration or while the light layer is in the closed configuration;
wherein the cleaning system includes fluid for cleaning;
wherein the light layer includes a plurality of light banks and a plurality of connectors; and
wherein some or all of the plurality of connectors include ports and the fluid extends through the ports to clean the plurality of light banks within the light layer.

14. The light system of claim 13, wherein the light system includes an axis and the light layer, the cap, or both are axially movable along the axis into and out of the base.

15. The light system of claim 13, wherein the cleaning system is a mechanical cleaner.

16. The light system of claim 13, wherein the fluid is water and the water is sprayed at the light layer or extends over the light layer to remove dirt, debris, or both.

17. The light system of claim 13, wherein the cleaning system includes a fluid reservoir that holds fluid so that the cleaning system can hydraulically clean the light layer.

18. The light system of claim 13, wherein the cleaning system includes a plurality of nozzles and the plurality of nozzles direct a fluid across the light layer.

19. The light system of claim 18, wherein the cap covers the plurality of nozzles when the light system is in a closed configuration.

20. The light system of claim 13, wherein the light layer provides light 360° around the light system.

* * * * *